(12) United States Patent
Cao

(10) Patent No.: US 10,547,179 B2
(45) Date of Patent: Jan. 28, 2020

(54) HIGH EFFICIENCY ELECTRIC POWER GENERATION AND CHARGING SYSTEM

(71) Applicant: Calvin Cuong Cao, Costa Mesa, CA (US)

(72) Inventor: Calvin Cuong Cao, Costa Mesa, CA (US)

( * ) Notice: Subject to any disclaimer, the term of this patent is extended or adjusted under 35 U.S.C. 154(b) by 117 days.

(21) Appl. No.: 15/943,409

(22) Filed: Apr. 2, 2018

(65) Prior Publication Data

US 2018/0226805 A1 Aug. 9, 2018

Related U.S. Application Data

(60) Provisional application No. 62/583,335, filed on Nov. 8, 2017, provisional application No. 62/481,626, filed on Apr. 4, 2017.

(51) Int. Cl.
| | | |
|---|---|---|
| *H02J 3/46* | (2006.01) | |
| *H02K 7/02* | (2006.01) | |
| *H02J 3/38* | (2006.01) | |
| *H02J 3/32* | (2006.01) | |
| *H02J 7/00* | (2006.01) | |
| *H02M 7/5387* | (2007.01) | |
| *H02P 9/48* | (2006.01) | |
| *H02J 3/00* | (2006.01) | |

(52) U.S. Cl.
CPC ............... *H02J 3/46* (2013.01); *H02J 3/005* (2013.01); *H02J 3/32* (2013.01); *H02J 3/382* (2013.01); *H02J 7/008* (2013.01); *H02K 7/025* (2013.01); *H02M 7/5387* (2013.01); *H02P 9/48* (2013.01); *Y02E 60/16* (2013.01)

(58) Field of Classification Search
CPC ...... H02J 3/00; H02J 3/005; H02J 3/32; H02J 3/38; H02J 3/46; H02J 3/382; H92J 7/00; H92J 7/008; H92J 7/5387; H02P 9/48
USPC ...... 307/57, 82, 80, 43, 38, 66, 64, 9.1, 10.1
See application file for complete search history.

(56) References Cited

U.S. PATENT DOCUMENTS

| | | | | |
|---|---|---|---|---|
| 5,225,712 A | * | 7/1993 | Erdman | ............... F03D 7/0272 290/44 |
| 6,788,029 B1 | * | 9/2004 | Gabrys | ..................... H02J 1/16 307/67 |

(Continued)

FOREIGN PATENT DOCUMENTS

| | | | |
|---|---|---|---|
| WO | 2009134115 A2 | 11/2009 | |
| WO | WO-2009134115 A2 | * 11/2009 | ............. H02K 53/00 |

OTHER PUBLICATIONS

International Search Report & Written Opinion for counterpart application No. PCT/US2018/025948 dated Jun. 20, 2018; 5 pages.

*Primary Examiner* — Rexford N Barnie
*Assistant Examiner* — Jagdeep S Dhillon
(74) *Attorney, Agent, or Firm* — Loza & Loza, LLP; Heidi L. Eisenhut

(57) ABSTRACT

Disclosed is a virtually renewable electric power-generating system configured to provide an efficient means for generating electricity for charging an electrical energy storage source such as batteries using the same energy storage source to power an electro-mechanical system for generating electricity. Part of the output of the electro-mechanical system for generating electricity is fed back to the energy storage source to recharge the storage source, as well as provide energy to charge a second energy storage system.

9 Claims, 4 Drawing Sheets

(56) References Cited

U.S. PATENT DOCUMENTS

| | | | | |
|---|---|---|---|---|
| 2008/0157592 A1* | 7/2008 | Bax | ......................... | H02J 7/022 |
| | | | | 307/10.1 |
| 2010/0270864 A1* | 10/2010 | Vyas | ......................... | H02J 7/35 |
| | | | | 307/82 |
| 2014/0316593 A1* | 10/2014 | Taimela | ................. | G05B 15/02 |
| | | | | 700/287 |
| 2015/0229162 A1* | 8/2015 | Gottfried | ................ | H02J 9/066 |
| | | | | 307/65 |
| 2016/0230785 A1* | 8/2016 | Boisvert | ............ | F16H 61/4035 |

* cited by examiner

HIGH EFFICIENCY ELECTRIC POWER GENERATION AND CHARGING SYSTEM

PRIORITY CLAIM

This application claims priority to and the benefit of Provisional Patent Application No. 62/481,626 filed in the United States Patent and Trademark Office on Apr. 4, 2017 and Provisional Patent Application No. 62/583,335 filed in the United States Patent and Trademark Office on Nov. 8, 2017, the entire content of both of these applications incorporated herein by reference as if fully set forth below in their entirety and for all applicable purposes.

TECHNICAL FIELD

The present disclosure relates generally to electrical power generation systems, and, more particularly, to a system for highly efficient energy storage device charging system that generates electrical energy using internal energy sources.

INTRODUCTION

Fossil fuels are a primary source of energy for the planet. The rate of fossil fuel consumption is likely to outpace the rate of fossil fuel production as the planet's population continues to grow and as less economically developed countries become industrialized. This expected increase in demand for fossil fuels could exhaust the global supplies of fossil fuels within the next several decades if consumption continues at the present rate. Thus, it is desirable to harness energy from renewable sources of energy such as solar power, wind power, hydro power, geothermal power, or to develop and utilize highly efficient electric power generating systems.

BRIEF SUMMARY OF EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In an aspect, an apparatus for power generation and energy source charging is disclosed. The apparatus includes a system controller configured to control operation of the apparatus for power generation, at least one first energy storage device, a direct current motor electrically coupled to the at least one first energy storage device via a motor controller, the motor controller configured to control at least the speed of the motor based on control signaling received from the system controller and drive the motor with power supplied from the at least one first energy storage device. Additionally, the apparatus includes a multi-phase alternating current generator having a rotor mechanically coupled to the motor through a mechanical drive mechanism including a flywheel of a predetermined mass and radius, wherein the motor drives the generator and flywheel via the mechanical drive mechanism, at least one transformer electrically coupled to at least one output phases of the multi-phase alternating current generator, wherein the transformer is configured to one of step up or step down the voltage present on the at least two output phases of the generator, and a voltage regulator coupled to an output of the at least one transformer, the regulator configured to regulate the voltage to a predetermined voltage value. Furthermore, the apparatus includes a first battery controller coupled to an output of the voltage regulator, wherein the first battery controller is configured to charge the at least one first energy storage device and a second energy storage device.

In another aspect, a method for generating and storing energy is disclosed, including coupling at least one first energy storage device to a direct current motor via a motor controller, the motor controller configured to control at least the speed of the motor based on control signaling received from a system controller and drive the motor with power supplied from the at least one first energy storage device. The method further includes mechanically coupling a rotor of a multi-phase alternating current generator to the motor through a mechanical drive mechanism including a flywheel of a predetermined mass and radius, wherein the motor drives the generator and flywheel via the mechanical drive mechanism. Furthermore, the method includes electrically coupling an output of the generator to at least one transformer, wherein the transformer is configured to one of step up or step down the voltage present on the at least two output phases of the generator and coupling a voltage regulator to an output of the at least one transformer, the voltage regulator configured to regulate the voltage to a predetermined voltage value. Finally, the method includes coupling a first battery charger to an output of the voltage regulator, wherein the battery controller is configured to charge the at least one first energy storage device and a second energy storage device also coupled to the battery charger.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

The present invention provides a system for highly efficient electric power generation that needs very little reliance on or input from external sources of energy to generate and store electrical energy, and is able to recapture and conserve energy initially present in the system.

Figure 1:
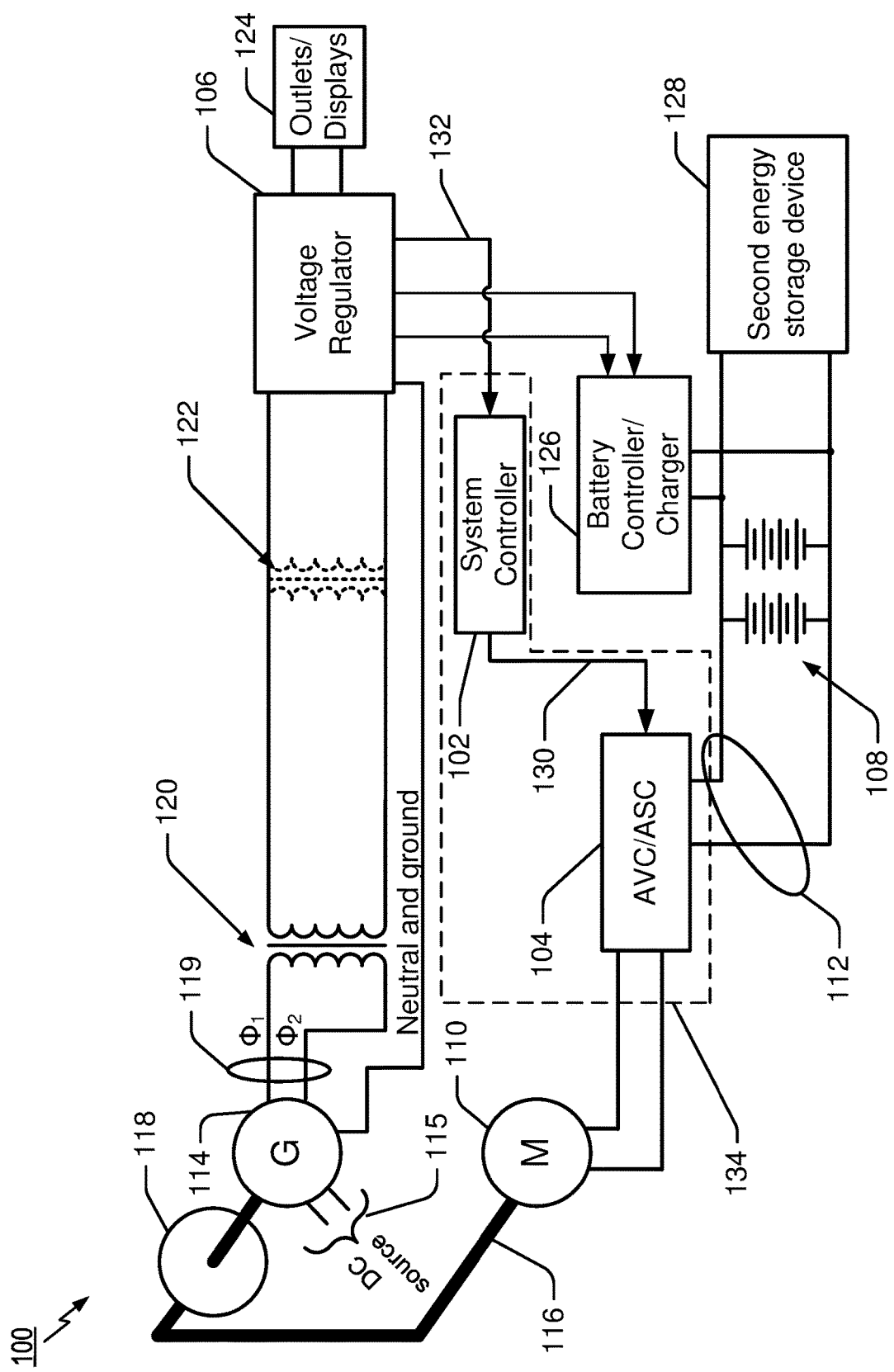
FIG. 1 is a schematic illustration of a power generation system according to aspects of the present disclosure.

FIG. 1 illustrates an apparatus 100 for power generation according to one exemplary implementation. In general, apparatus 100 provides power generation by using a stored source of energy to drive an electro-mechanical system for electricity generation that, in turn, feeds back energy from the system for electricity generation to replenish the stored source of energy as well as provide power for various electrical loads, such as energy to be stored in another energy storage device, as well as power for peripheral devices.

The apparatus 100 includes an electronic system controller 102 that is configured to control operation of the apparatus 102, including specific control of a motor controller 104, as well as a voltage regulator 106 in some examples, as will be discussed later. The apparatus 100 includes at least one first energy storage device 108, which may consist of one or more batteries, connected either in series or in parallel, or both, depending on specific voltage and current requirements. In one aspect, the energy storage device 108 may consist of two rechargeable 12 volt lead-acid batteries connected in parallel to supply electrical energy to a direct current motor 110 via the control of motor controller 104, but this is merely exemplary and any number of combinations of batteries and types of batteries may be utilized for supplying energy to the motor 110.

The motor controller 104 may be implemented with an automatic voltage control/automatic speed control (AVC/ASC) type controller wherein either a manual input or a control signal input 130 from system controller 102 is used to set a target speed for motor 110, or to vary the speed dynamically in other aspects. As illustrated in FIG. 1, in this example the positive and negative voltage lines 112 from energy source 108 are input to motor controller 104, which in turn varies the voltage and/or current that is output to motor 110.

Motor 110 may be implemented with a permanent magnet DC motor to avoid having to generate a magnetic field through an external source of energy, and further may be selected such that the rotational speed may be In some aspects, the motor 110 may be operated with voltage inputs from the controller 104 from ½ VDC to 1.5 VDC, or 3 VDC to 6 VDC, or 12 VDC to 24 VDC, or 48 VDC to 96 VDC, and so forth, wherein the voltage range is adjusted as needed to generate the necessary torque or speed for driving a rotor of an electric generator 114.

Motor 110 is configured to drive the rotor of generator 114 through a mechanical linkage or mechanism, shown simply with a line to denote the mechanical connection 116, which mechanically couples a rotor of motor 110 with the rotor of the generator 114. As will be appreciated by those skilled in the art, the mechanical connection 116 may be implemented with any of a number of known mechanical linkages, such as a pulley and belt drive mechanism, a direct mechanical linkage, a gear linkage, and so forth. Also connected with the mechanical linkage is a flywheel 118 having some predetermined mass and radius as a means of storing mechanical energy when driving the generator 114. The flywheel 118 is preferably linked to the rotor of the generator and rotates around the same axis of rotation as the generator rotor.

In certain aspects, generator 114 may be implemented with an alternating current (AC) multi-phase or polyphase generator, such as a 3 phase AC generator. In further implementations, the generator may be a Y connected generator at the output terminal thus having three phases and one neutral output (or alternatively a delta connected generator having 3 phases output), In one example, the generator 114 may be configured to output a voltage that is dependent upon the speed at which the generator is operated by motor 110. In some implementations, the output voltage of generator 114 is 480 VAC, phase to phase. However, if the speed is increased, the generator may be configured to provide increased voltage. For example, in some operational aspects, the line voltage may be increased to approximately 800 volts AC or more, with a line-to-line or phase-to-phase voltage at approximately 1360 volts AC. It is further noted that, in one example, the field windings of the generator 114 require a DC field excitation. Field windings of the generator rotor will receive a DC supply (shown at 115), which are supplied to the rotor winding through the slip rings and brushes. The source of DC supply 115 may be storage device 108 in one embodiment, but also the field excitation may be supplied by the system controller 102 and/or motor controller 104.

In the example of FIG. 1, two phases of the generator ($\Phi_1$ and $\Phi_2$ as shown at 119) of the generator 114 are electrically coupled to a transformer 120, but other implementations may be also envisioned where one phase and the neutral of a Y connected generator are coupled to transformer 120. Transformer 120 may be a step up or step down transformer. In the present example of FIG. 1, the generator 114 may be a 480 V three phase generator. In further embodiments multiple transformers may be utilized as illustrated by optional transformer 122, such as in cases where the voltage of generator 114 is higher, such as 1360 VAC, thus necessitating multiple transformers to step down the voltage to various voltage stages for various uses or voltage requirements. The output of transformer 120 (and/or transformer 122) is input to the voltage regulator 106, which may be used to regulate the voltage input to a set value, as well as output AC power to various outlets, as well as metering displays and the like as illustrated by block 124.

The voltage from the voltage regulator 106 may be delivered to the system controller 102 (as shown by coupling 132, which may be both a monitoring signal/connection and a power supply connection for the controller 102), which may include various processors, logic, and electronic circuitry for analyzing the status of the output system power from regulator 106, and, in turn, control the motor controller 104 to adjust for system conditions and to thereby maintain particular speed target(s) for the motor 100. In an aspect, the voltage regulator may be configured using a Variac transformer (e.g., Model no: SC-20M, Max-2000 VA, having an input rating of 117 V, AC 60 Hz, and an output of 0-130 V AC 60 hz.

Additionally, the power output of the regulator 106 is coupled to a battery controller or charger 126. The battery charger/controller 126 is configured to convert the AC input to DC for charging of the first energy storage source 108. Other features of the charger/controller 126 may include battery reconditioning and float mode charging. In one example, the battery charger may be implemented using a Caterpillar CBC 40 W, 40 amp battery charger, but the invention is not limited to such. Moreover, another load that may be added to the system 100 is a second energy storage device 128, which may be an array of battery cells or capacitive elements to store large amounts of energy. In an example, the second energy storage device 128 may comprise six 12 V DC batteries, such as Power Sonic batteries Model PS-12550 having a 55 AH capacity and sealed lead-acid construction using absorbent glass mat (AGM) technology. However, the second energy storage device 128 may be comprised of any number of batteries and any number of types of batteries such as lead-acid ("flooded", deep-cycle, and VRLA), NiCad, nickel-metal hydride, lithium-ion, Li-ion polymer, Li-ion Phosphate, zinc-air, molten-salt batteries, Redox, and alcohol-air breathing as examples. It is further noted that the second energy storage device 128, when connected in parallel with the first energy storage device 108, as illustrated, may be utilized to help supply fed back energy for driving of motor 110. Although the system 100 illustrates a fixed connection of the first and second energy storage devices 108 and 128, the second energy storage device 128 could be selectively switched to couple in parallel with the first energy storage device 108 with switches (not shown).

In an alternative embodiment, the system controller 102 and motor controller 104 may be implemented as a single control unit, as indicated at 134. In such case, the control unit 134 performs the functionalities of monitoring the output voltage from voltage regulator 106, determining or setting a voltage (and thus speed) for the motor 110 based on the monitored voltage. In yet a further particular aspect, this unitary control unit 134 may be implemented using a known SX460 half-wave phase-controlled thyristor type Automatic Voltage Regulator (AVR) that is applied to control of motor 110.

Of further note, while the first and second energy storage devices are described with examples of various battery numbers and battery type, the present disclosure is not limited to such. That is, the energy storage devices may be implemented with other known energy storage devices such as capacitors or other electrical charge storage devices, or any other known devices capable of storing electrical energy.

Figure 2:
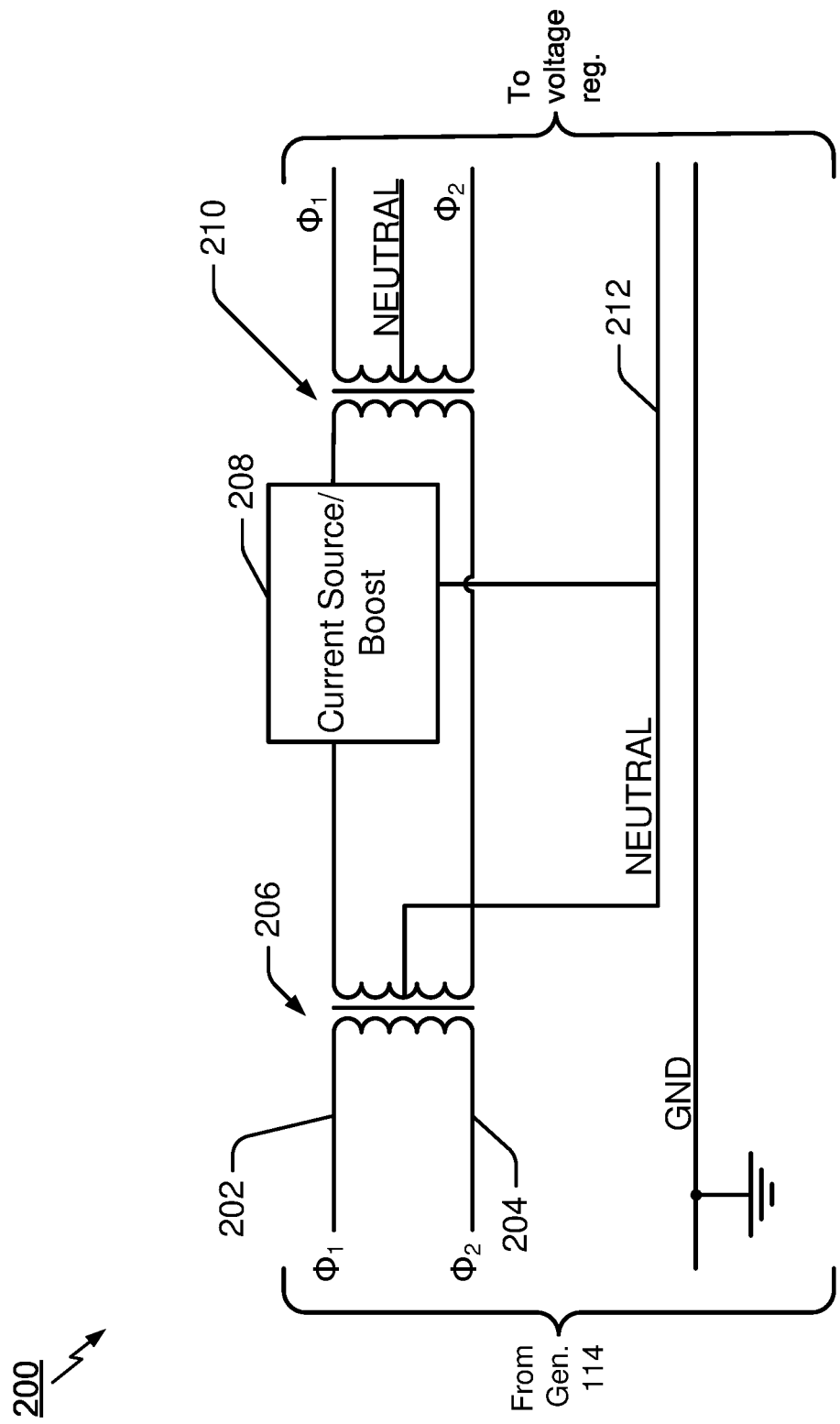
FIG. 2 is a schematic illustration of an implementation of a portion of the power generation system of FIG. 1 according to other certain aspects of the present disclosure

FIG. 2 illustrates another embodiment of a portion of the system 100 shown in FIG. 1. In particular, FIG. 2 shows a portion of the system 100 where two phases of the generator 114, shown by lines 202, 204, are input to a step-down transformer 206. In an example, the voltage between phases 202 and 204 may be 480 V at the primary input side of transformer 206 and the secondary side of transformer 206 is 240 volts. The transformer 206 may include a center tap for a neutral such that the voltage difference between each secondary coil output and the neutral is 120 volts.

The system 200 also includes a current source or current booster 208 coupled to the output of transformer 206 for adjusting the current input to a second transformer 210. The current booster 208 is utilized to increase or boost the current present from transformer 206 to increase the current amount for input to the second transformer (it may be helpful to include more of the theoretical reasons for this current boost and how this affects the operation of the second transformer 206). In an exemplary implementation, the current source 208 may be configured using another transformer, such as another step down transformer providing increased current on the secondary.

Figure 3:
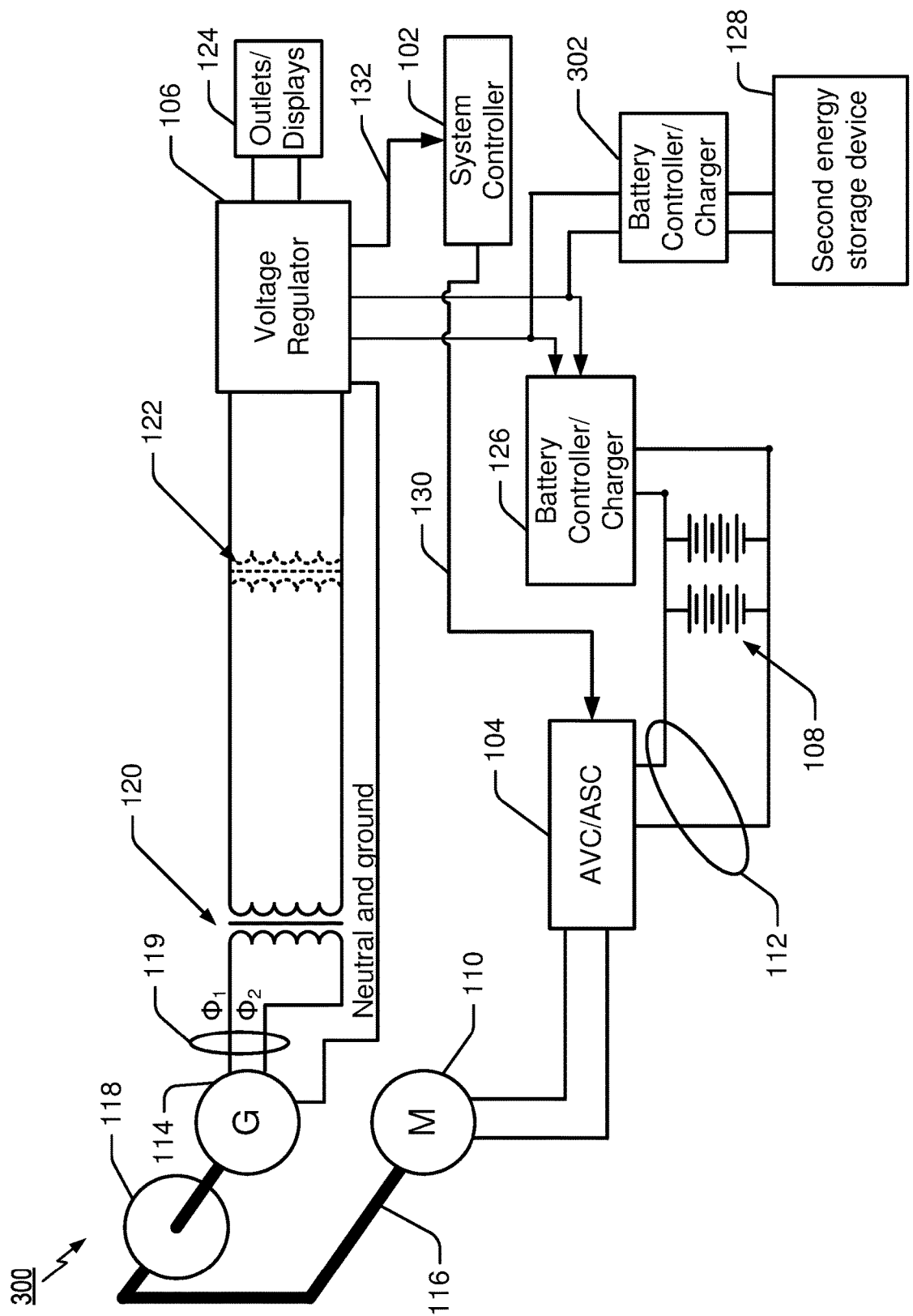
FIG. 3 is a schematic illustration of another variation of the power generation system according to aspects of the present disclosure.

FIG. 3 is a schematic illustration of another variation 300 of the power generation system according to aspects of the present disclosure. In this figure, all like numbered elements correspond to the system of FIG. 1 and their description and functionalities are not repeated here for the sake of brevity. In this example, the second energy storage device 128 may include a separate high power, high current battery controller/charger 302 that may further include logic provide specific charging requirements for second energy storage device 128. In an example, the charger 302 may be configured to provide charging at 440 Amps current and 10,000 Watts of charging power. Further, the controller/charger 302 may be implemented using 12 volt digital charger, which may also include a built-in inverter (not shown), such a controller model number CBSU12DIGW manufactured by Missouri Wind and Solar, as one example.

Figure 4:
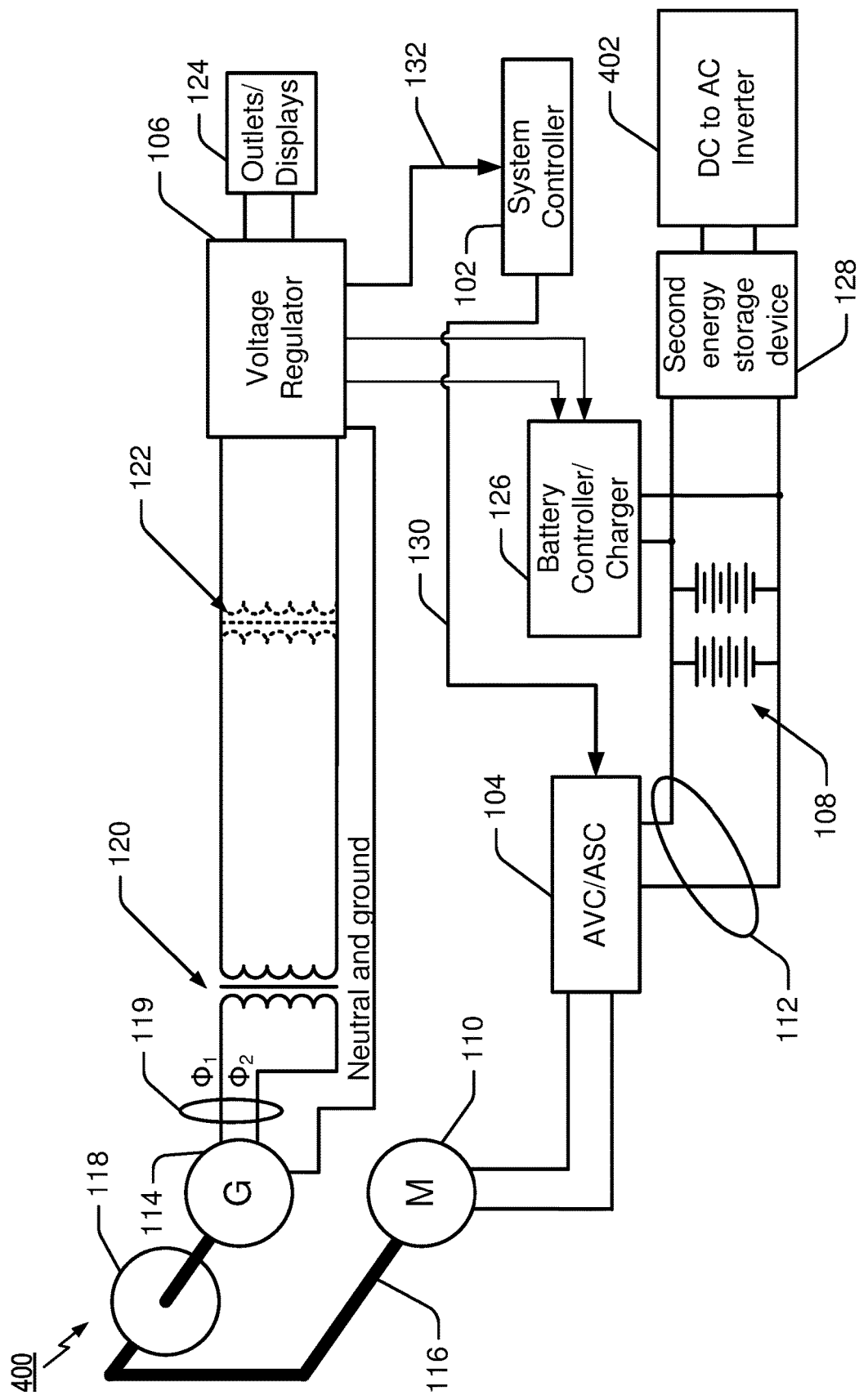
FIG. 4 is a schematic illustration of another variation of the power generation system according to aspects of the present disclosure.

FIG. 4 is a schematic illustration of another variation 400 of the power generation system of FIG. 1 according to aspects of the present disclosure. In this figure, again all like numbered elements correspond to the system of FIG. 1 and their description and functionalities are not repeated here for the sake of brevity. In this example, the second energy storage device 128 (and/or first energy storage device 108) may be coupled to a DC to AC inverter 402. Thus, the inverter may be provided to utilize stored energy in either second energy storage device 128 or the first energy storage device 108 for peripheral AC loads that may be coupled to the system.

In light of the foregoing, it is noted that the utilization of a feedback type charging of the supply power source 108, along with features including a flywheel 118 incorporated with the generator 114 and current boosting has been shown to provide a higher efficiency system for supplying energy for charging a second battery pack or array (e.g., second energy storage source 128), thus increasing the time at which the present system may be able to charge the second energy source.

It is further noted that in operation of the systems disclosed herein, testing of the assembled system showed operation of the system for over 5 hours using an implementation with two 12 VDC lead-acid batteries as the first energy storage device (e.g., 108) receiving fed back energy for recharging, whereas without this fed back energy, the system only operated less than one hour using the energy stored in the first energy storage device. Also testing of the system with both the first and second storage devices connected in parallel (See e.g., the system illustrated in FIG. 1) such that both devices 108 and 128 are recharged with energy fed back via charger 126 yielded a high efficiency system that was capable of operating more than 22 hours, along with charging the second energy storage device 128, whereas without the feedback of electrical energy, the system could only run approximately 1.75 hours.

The foregoing description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus for power generation comprising:
    a system controller configured to control operation of the apparatus for power generation;
    at least one first energy storage device;
    a direct current motor electrically coupled to the at least one first energy storage device via a motor controller, the motor controller configured to control at least the speed of the motor based on control signaling received from the system controller and drive the motor with power supplied from the at least one first energy storage device;
    a multi-phase alternating current generator having a rotor mechanically coupled to the motor through a mechanical drive mechanism including a flywheel of a predetermined mass and radius, wherein the motor drives the generator and flywheel via the mechanical drive mechanism;
    at least one transformer electrically coupled to at least one output phases of the multi-phase alternating current generator, wherein the transformer is configured to one of step up or step down the voltage present on the at least two output phases of the generator;
    a voltage regulator coupled to an output of the at least one transformer, the regulator configured to regulate the voltage to a predetermined voltage value;
    a first battery controller coupled to an output of the voltage regulator, wherein the first battery controller is configured to charge the at least one first energy storage device and a second energy storage device;
    a current source coupled to the output of the secondary coil of the first transformer, wherein the current source is configurable to provide a set current at the output of current source based on load demand as determined in the system controller; and
    a second transformer coupled to an output of the current source, wherein an output the second transformer is coupled to the voltage regulator.

2. The apparatus of claim 1, further comprising:
    a DC to AC inverter coupled to one of the first energy storage device or the second energy storage device, and configured to generate AC power from the direct current first or second energy storage devices.

3. The apparatus of claim 1, wherein the first energy storage device comprises at least a plurality of batteries coupled in parallel.

4. The apparatus of claim 1, wherein the first energy storage device comprises at least a plurality of batteries coupled in series.

5. The apparatus of claim 1, wherein the second energy storage device comprises a plurality of batteries cells having total storage capacity greater than the first energy storage device.

6. The apparatus of claim 1, wherein the multi-phase alternating current generator comprises a 3 phase synchronous generator that outputs three phases, wherein at least two of the three output phases are coupled to a primary coil of the at least one transformer.

7. The apparatus of claim 1, wherein the current source comprises a third transformer configured as a step down transformer having a secondary current output greater than the primary current input.

8. The apparatus of claim 1, further comprising:
    a second battery controller coupled to an output of the voltage regulator, wherein the second battery controller is configured to charge the second energy storage device instead of the first battery controller.

9. The apparatus of claim 1, further comprising an inverter coupled to at least one of the first or second energy storage device and configured to invert the DC current of the storage devices to AC current.

\* \* \* \* \*